United States Patent [19]

Horber

[11] Patent Number: 4,687,961
[45] Date of Patent: Aug. 18, 1987

[54] POLYPHASE DC MOTOR WITH SENSOR POLES

[75] Inventor: Ralph W. Horber, Marshfield, Mass.

[73] Assignee: Seiberco Incorporated, Braintree, Mass.

[21] Appl. No.: 840,008

[22] Filed: Mar. 17, 1986

[51] Int. Cl.[4] .......................... H02K 3/16; H02P 6/02
[52] U.S. Cl. ...................................... 310/186; 310/65; 310/216
[58] Field of Search .................... 310/68 R, 68 B, 162, 310/186, 254, 216, 217; 318/138, 254, 653; 336/135

[56] References Cited

U.S. PATENT DOCUMENTS

| | | |
|---|---|---|
| 1,882,487 | 10/1932 | Dupont .................................. 310/65 |
| 3,453,512 | 7/1969 | Polakowski . |
| 3,501,664 | 3/1970 | Veillette . |
| 3,541,407 | 11/1970 | Lahde . |
| 3,590,353 | 6/1971 | Kobayashi et al. . |
| 3,683,248 | 8/1972 | Kobayashi et al. . |
| 3,794,895 | 2/1974 | Coupin et al. . |
| 3,903,463 | 9/1975 | Kanamori . |
| 3,997,823 | 12/1976 | Machida . |
| 4,096,420 | 6/1978 | Gosling et al. . |
| 4,162,435 | 7/1979 | Wright . |
| 4,262,237 | 4/1981 | Gelenius . |
| 4,292,575 | 9/1981 | Kühnlein .............................. 318/138 |
| 4,297,622 | 10/1981 | Dittman et al. . |
| 4,481,440 | 11/1984 | Muller . |
| 4,495,450 | 1/1985 | Tokizaki et al. . |
| 4,551,658 | 11/1985 | Rhee .................................... 318/254 |

OTHER PUBLICATIONS

Article entitled "Multiple-Pole Stepping Motor", by Ted T. Lin, Rotorque Tech. Corp., Milpitas, CA.

Primary Examiner—Patrick R. Salce
Assistant Examiner—D. L. Rebsch

[57] ABSTRACT

A polyphase brushless DC motor has an integral automatic feedback arrangement and a high degree of magnetic balance. The stator pole elements of the motor are identical and equidistantly spaced, and the coils with which they are wound are connected as pairs; the pole elements in most of the armature pairs are directly adjacent one another. The sensor means has at least two circuit legs, each being connected to paired pole elements of the stator to provide a sensor channel, the channels cooperating to provide highly accurate rotor position feedback information.

25 Claims, 8 Drawing Figures

POLYPHASE DC MOTOR WITH SENSOR POLES

BACKGROUND OF THE INVENTION

Electrical servo systems are widely utilized for many different applications in which position control is necessary; typically, they are used to drive robots and X-Y tables, to position mirrors for laser applications and gun turrets, in integrated circuit production equipment, and the like. Primary criteria for such systems are of course high precision and responsiveness to input commands, as well as economy and facility of manufacture, reliability and durability.

Stepper motors have been used for such motion control applications, and are advantageous from the standpoint of providing high stiffness and positioning capability, coupled with comparatively low cost and relative simplicity. However, they do not generally offer optimal dynamic characteristics and, because of the absence of feedback capability, elements of uncertainty are inherent.

Closed loop DC servo motor systems provide considerable dynamic performance benefits, including speed range, acceleration, torque-to-inertia ratios, and frequency response; however, they tend to be deficient in static performance characteristics. Moreover, the feedback devices employed in such servo motor systems for the extraction and utilization of information for commutation, and for speed and position control (e.g., shaft angle position detectors, tachometers, encoders and resolvers), are expensive, tend to be fragile in some instances, and may give rise to unreliability. In general, systems of this kind are relatively complex and troublesome to install and maintain.

Accordingly, it is a broad object of the present invention to provide a novel motion control system, and a novel brushless DC motor for use therein, which are relatively simple and inexpensive to manufacture, which afford a highly desirable balance of accuracy, speed and torque characteristics, and which are highly effective, efficient and reliable for their intended purposes.

A more specific object is to provide such a brushless DC motor which operates in a closed loop mode, without need for any added feedback device, and in which the magnitude and accuracy of the feedback signal is maximized.

Additional objects of the invention are to provide a motor having the foregoing features and advantages, which is highly responsive to commands, which enables extraction of exact rotor position information at standstill and has a large number of angular resolution points to provide very precise position information, and which has very smooth running, and full power starting, torque characteristics.

The prior art shows a wide variety of systems and motors, some of which may be employed for motion control applications and may have certain of the features hereinabove discussed, as indicated by the following U.S. patents:

Polakowski, No. 3,453,512 provides a brushless DC motor which employs silicon controlled rectifiers in the armature switching circuits, the turn-on signal being generated by an angular position detector and the turn-off signal being generated by a capacitor. The position detector may consist of a series of stationary coils which are sequentially inductively coupled, by a member mounted to rotate with the field structure, with a common coil.

In Veillette, No. 3,501,664, a system is disclosed for regulating a DC motor having an internal stator field that is rotated in space 90° ahead of the rotor field. The stator has teeth on its inner periphery arranged in nondiametrically oriented pairs, which carry secondary windings through which current, applied through a primary winding on the main body of the stator, is transferred sequentially as the rotor poles align with the teeth during rotation. As illustrated, the teeth of the stator are identical, and taper in the radially inward direction.

The DC motor taught by Lahde, No. 3,541,407 utilizes two-terminal field coils as both a pickup, to sense the position of the rotor, and also as a power coil to provide driving torque.

Kobayashi et al, No. 3,590,353 shows an electronically commutated motor having an outside and an inside rotor positioned on a common shaft, the inside rotor serving a position detecting function. Primary and secondary windings on an internal detecting stator are variably electromagnetically coupled, depending upon the position of the rotor.

A phonograph turntable, driven directly by an electrically controlled, variable speed brushless DC motor, is shown in Kobayashi et al, No. 3,683,248. Winding pairs within the stator are selectively coupled, depending upon the position of an internal position detector rotor, to control current flow through particular outer stator windings to drive an external rotor.

In Coupin et al, No. 3,794,895, an electronically commutated DC motor is described in which the stator is wound with pairs of power and detector coils, the latter providing a speed-dependent signal which is dephased by 90° for control of the power amplifier.

A self-exciting DC motor, having means for preventing rotation in one direction, is disclosed in Kanamori No. 3,903,463. The stator poles are wound with both field and armature coils, and the position detecting elements include cores that are magnetically saturated by a permanent magnet and high frequency coils.

Machida No. 3,997,823 teaches a circuit for a brushless DC motor, in which the stator employs star-connected fixed windings. Means is provided for detecting position signals induced in the fixed windings by rotation of the rotor, which signals are employed to control switching means for supplying driving current to at least one of the windings.

In Gosling et al, No. 4,096,420, an oscillator with an LC resonance circuit is employed in the control circuit for a brushless DC motor, oscillation of the oscillator being modulated in response to induction caused in a sensing coil by the rotor field.

Wright, No. 4,162,435, discloses a circuit for a brushless DC motor, wherein the voltage induced across one unenergized winding is sampled, integrated and compared to a predetermined, position-indicating voltage to derive a control signal while at least one other winding is energized, for selective commutation.

A commutatorless DC motor drive system is provided by Gelenius, No. 4,262,237, in which a permanent magnet rotor induces AC potential waveforms in phase displaced stator phase windings. Means is provided for initiating rotor rotation from standstill, to initially induce the potential waveforms in the stator phase windings, means is provided for producing a switch point reference signal, and means responsive to the induced waveforms is provided for sustaining rotor rotation by sequentially completing and interrupting individual stator phase winding energizing circuits, in controlled relation to the reference signal.

Dittman et al, No. 4,297,622, discloses a two phase gyrosystem which employs two series-connected, motion-sensing reference coils, located 180° apart, for motor drive and control.

A brushless DC motor is disclosed in Muller, No. 4,481,440 which utilizes a permanent magnet rotor in which the poles, viewed in the direction of rotation, have approximately rectangular or trapezoidal magnetization curves. The harmonic fields included in such poles induce voltages in a sensor winding of the stator which corresponds to the harmonic wave for which the winding is dimensioned.

A control device for a brushless DC motor is taught in Tokizaki et al, No. 4,495,450. It has a rotor position detecting circuit in which voltages induced in stator coils by rotation of the rotor are compared to neutral voltage at a virtual neutral point to detect polarity changing points. Based thereupon, an inverter controls the conducting modes of the stator coils to control rotation of the motor.

The DC motor of Rhee, No. 4,551,658 includes brushes and a commutator. After starting, the brushes are centrifugally displaced from the commutator to break the starting circuit.

In June of 1985, an article entitled "Multiple-Pole Stepping Motor" was published. It describes a hybrid stepping motor wound for two-phase operation, wherein every two adjacent poles of each group are connected in series, but for opposite polarity.

SUMMARY OF THE INVENTION

It has now been found that certain of the foregoing and related objects of the invention are readily attained by the provision of a polyphase, direct current electric motor. The motor employs a stator made of a magnetic material, comprised of a generally cylindrical body portion and a multiplicity of identical pole elements which extend radially from the body portion at locations spaced about it; a corresponding multiplicity of coils are wound about the pole elements. Sensor means is provided which has at least two electrical circuit legs, one of the legs being connected to the coils on a first pair of the pole elements and the other leg being connected to the coils on a second pair thereof. The elements of the first-mentioned pair are disposed on the body portion of the stator in a non-interposed relationship with the elements of the second-mentioned pair, with the sensor means-connected coils adapting them to function as sensor poles, providing at least two channels for the generation of signals which will be indicative of the angular orientation of a rotor assembled with the stator. The motor will also include power supply means for providing at least two phases of current, the power supply means having one circuit portion connecting the coils wound about a first plurality of the stator pole elements in series, for energization by one phase of current, and having another circuit portion connecting the coils wound about a second plurality of the pole elements in series, for energization thereof by a second phase of current, thereby adapting the associated pole elements to function as first and second phase torque poles. The total number of pole elements on the body portion of the stator will be such that, when divided by the number of phases provided by the power supply means, the quotient will be of even value, and the "first" and "second" phase torque poles are so interposed with one another, and so disposed with respect to the sensor poles, that a magnetically balanced configuration is provided when the torque poles are energized.

In its preferred form, the motor will employ a stator in which at least certain of the "first" phase torque poles are disposed directly adjacent one another, with the coils thereon wound in opposite directions to magnetically couple them when energized, and in which at least certain of the "second" phase torque poles, and the coils thereon, are similarly disposed and wound. Normally, the torque pole couples of each phase will be separated by at least one torque pole of the other phase, and the sensor poles will advantageously be spaced from one another and paired with a directly adjacent non-coupled torque pole. One of the two sensor poles of each channel will advantageously have a non-coupled torque pole of each phase disposed directly adjacent to it, and the coils on all of the sensor poles will generally be wound in the same direction. Most desirably, the pole elements will be equidistantly spaced from one another on the stator body portion.

In one specific form, the pole elements will number 24 and will be spaced from one another by 15 mechanical degrees. Four of such elements may be sensor poles, four may be non-coupled torque poles associated with the sensor poles, and 16 may be coupled torque poles. Ideally, each pair of coupled torque poles of one phase will have a pair of coupled torque poles of the other phase directly adjacent to it, and the stator will be symmetrical, in regard to the arrangement of torque and sensor poles, taken with respect to an axial plane.

The pole elements of the stator will usually extend inwardly, to define a space for the rotor, which will in such a case comprise a cylindrical core having an array of pole elements circumferentially disposed on its outer surface. When the power supply means employed provides two phases of current, the rotor pole elements will be permanent magnets of alternating polarity in the array, and the ratio of the number of stator pole elements to rotor pole elements will be either 4:3 or 4:5; in a particularly preferred form, the stator will have 24 pole elements and the rotor will have 18 magnet elements thereupon. When the power supply means provides three phases of current, the rotor pole elements may be either permanent magnets or steel poles, and the ratio of the number of stator pole elements to rotor pole elements will be 3:2.

Other objects of the invention are attained by the provision of a motion control system comprising a polyphase, direct current electric motor which includes a stator and a coacting rotor, both as hereinabove described. The pairs of sensor poles provided on the stator thereof will be disposed in a non-interposed relationship, with the sensor channels spaced electrically from one another by angular distances that depend upon the number of phases of the motor. The sensor means will supply high frequency alternating current, thereby causing signals to be generated in the channels that are out-of-phase with one another, and are indicative of the angular orientation of the rotor. By operative interconnection with control means, the out-of-phase signals from the sensor means can be employed for modulation of the pulse widths of the phases of current provided by the supply means, and for effecting the selective energization of the torque poles.

In the preferred embodiments of the system, the motor will be a two-phase machine and the circuitry of the sensor means will have two legs, providing sensor channels that are 90° electrical out-of-phase with one another to generate sine-cosine related signals. Normally, such a system will additionally include inverter means for providing single level voltage signals of varying amplitude from the sensor means, and a microprocessor will provide the control means, interconnecting the power supply means and the sensor means through the inverter means. Most desirably, the system will generate 8 to 20 electrical cycles per revolution of the rotor.

DETAILED DESCRIPTION OF THE ILLUSTRATED EMBODIMENT

Turning now in detail to FIGS. 1 to 7 of the appended drawings, therein illustrated is a brushless DC motor, generally designated by the letter "M", embodying the present invention. It consists of a permanent magnet rotor, generally designated by the numeral 10, a stator, generally designated by the numeral 12, and front and rear end caps, generally designated respectively by the numerals 14 and 16. The rotor 10 consists of a cylindrical core 18 with axial shaft portions 20, 22, and having an array of high energy permanent magnets 24 secured (such as by adhesive bonding) on the surface thereof and extending longitudinally (axially) therealong; the magnets are disposed with their polarities alternating in the array, and will advantageously be made of samarium/cobalt alloy. Suitable bearings 25 are mounted within the end caps 14, 16, and serve to receive the opposite end portions 20, 22 of the shaft for rotatably supporting the rotor 10, in a conventional fashion.

Figure 1:
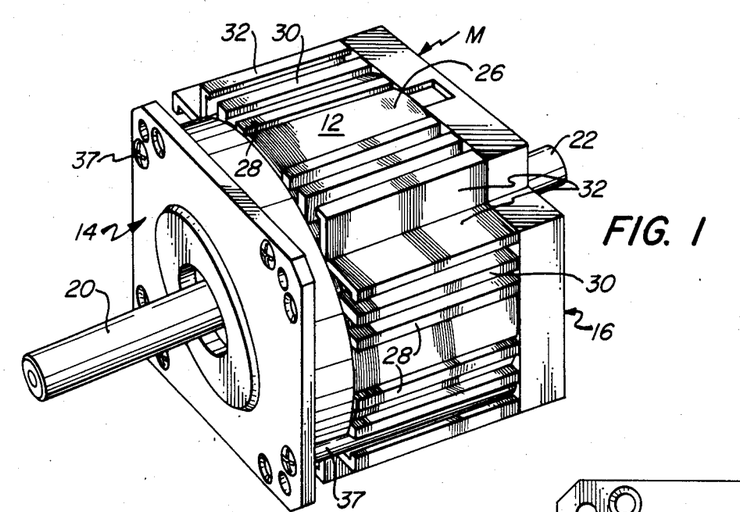
FIG. 1 is a perspective view of a motor embodying the present invention.
Figure 2:
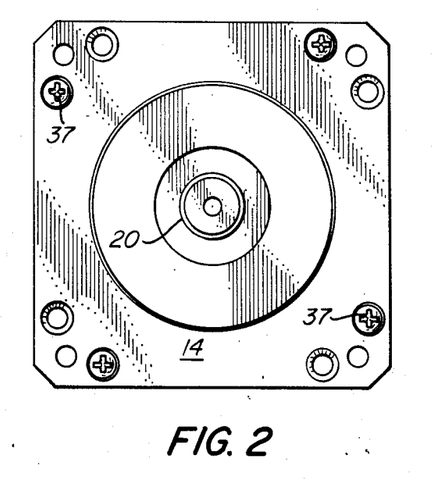
FIGS. 2, 3 and 4 are front, rear and side-elevational views of the motor.
Figure 3:
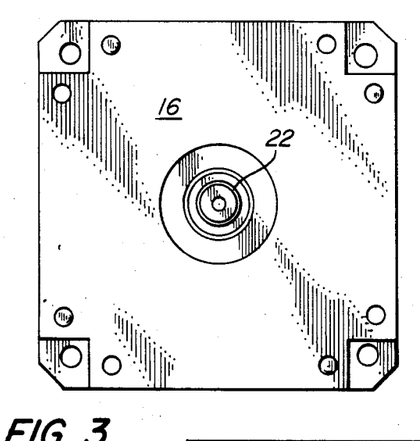
Figure 4:
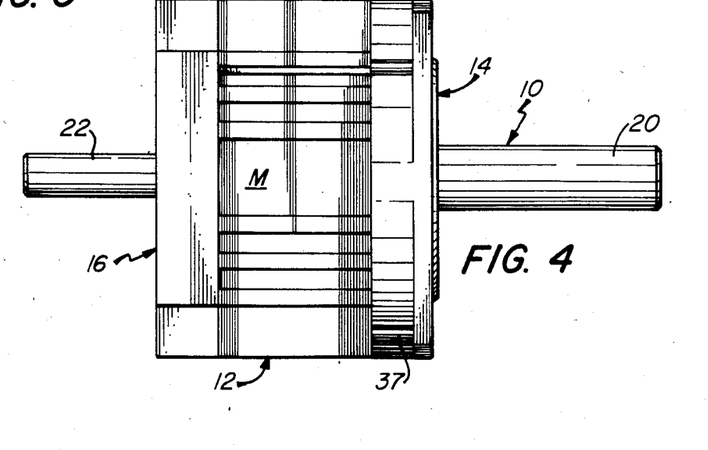
Figure 5:
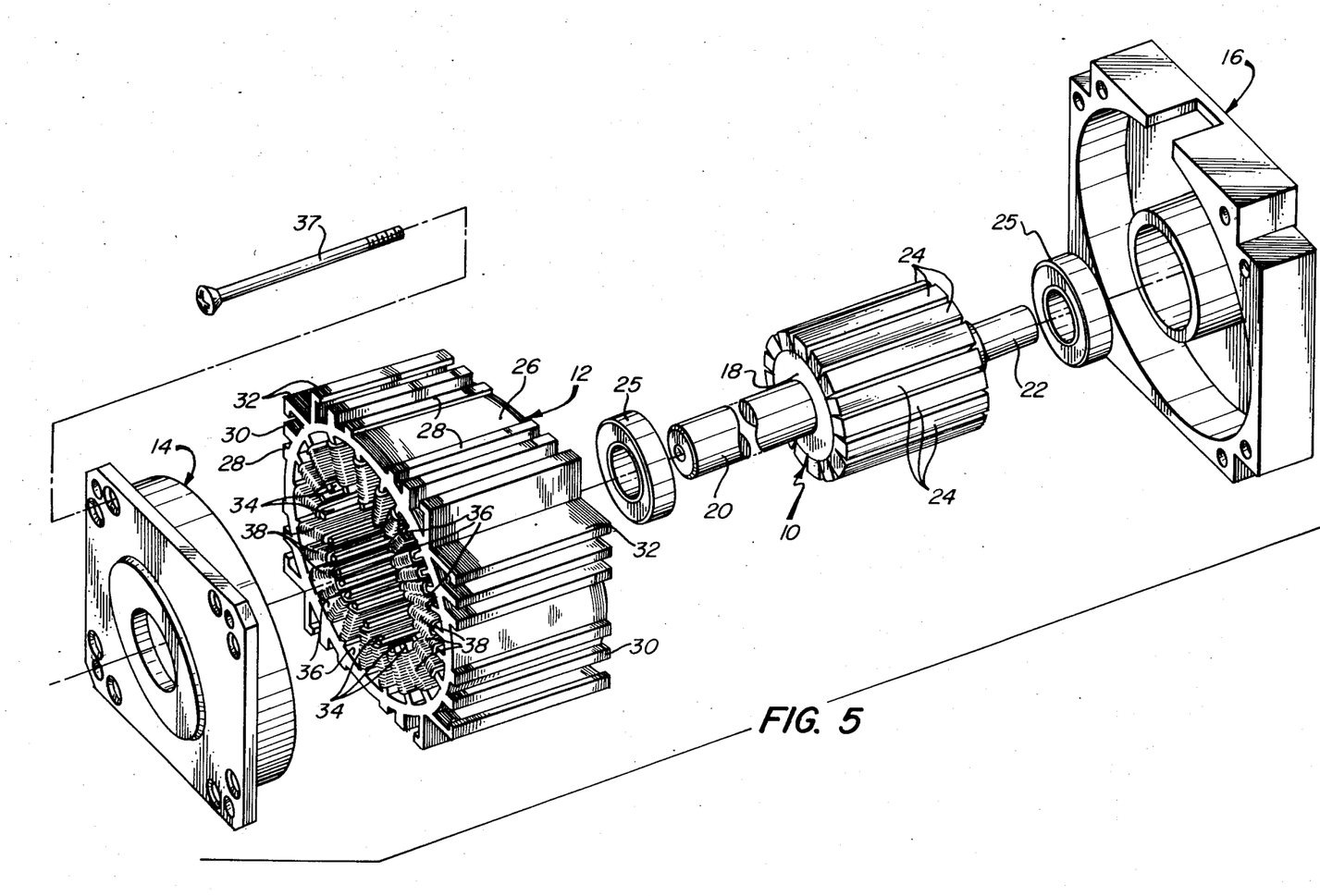
FIG. 5 is an exploded perspective view thereof.
Figure 6:
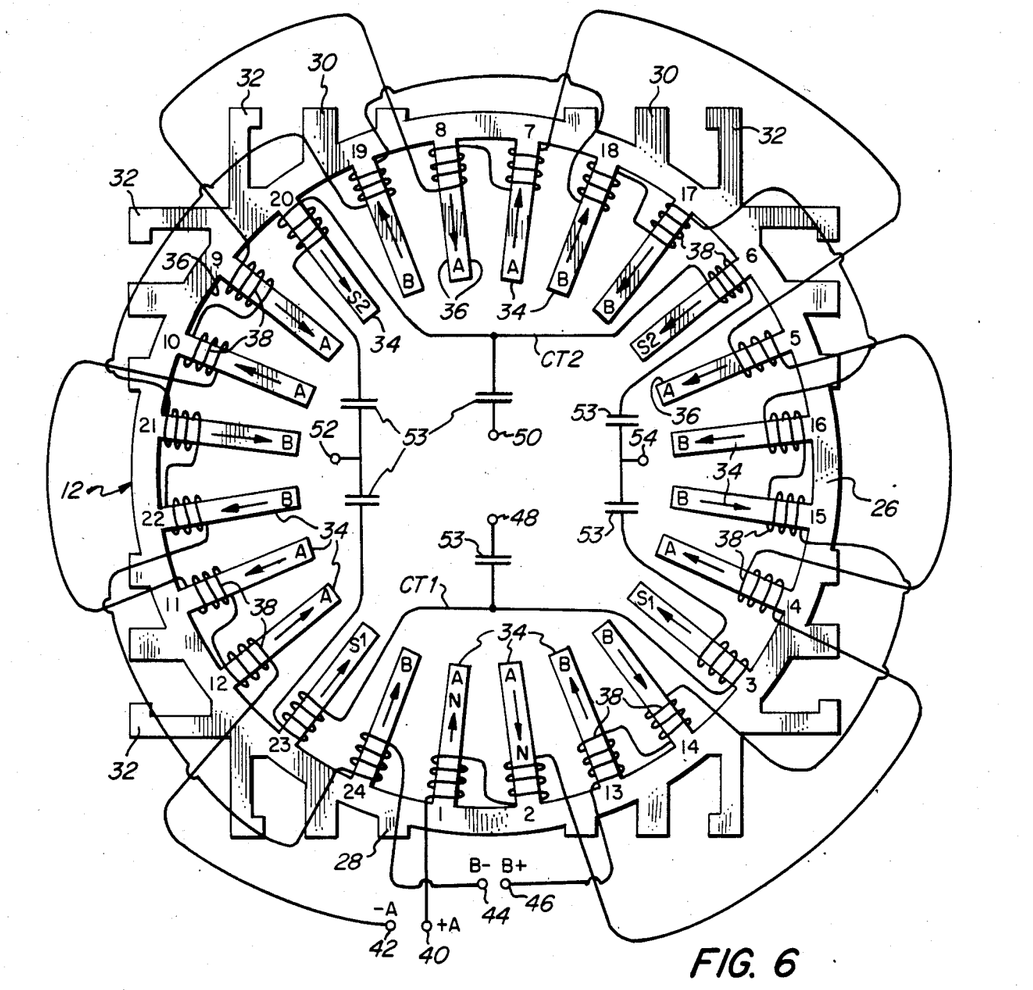
FIG. 6 is an end view of the stator of the motor drawn to an enlarged scale, with the wiring schematically illustrated.
Figure 7:
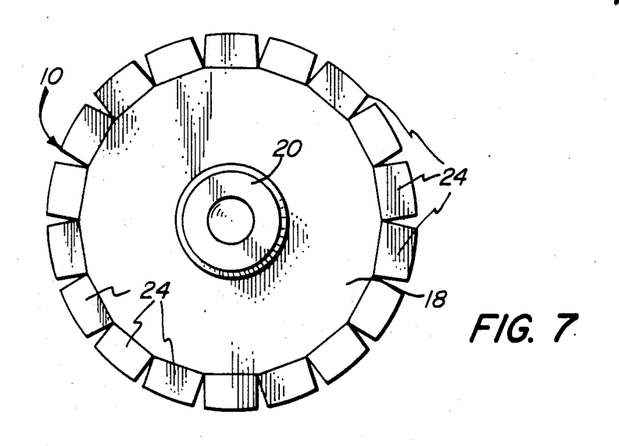
FIG. 7 is an end view of the rotor of the motor drawn to the scale of FIG. 6.

The stator 12 comprises numerous laminae of punched or stamped steel fabrication, the configuration of which is most clearly shown in FIG. 6 (although characterized as an end view of the stator, the Figure may be considered to show the structure of an individual laminae). As can be seen, the laminae consist of an annular body element 26, with outwardly extending tab elements 28, 30, 32, and with 24 pole elements 34 extending radially inwardly therefrom at equidistantly spaced locations about its inner circumference; each lamina is of course of one-piece, integrally formed construction. The pole elements 34 are of rectangular configuration and, as a result, define slots 36 therebetween which are relatively wide at the base and taper in a radially inward direction. As will be appreciated, the stacked laminae 24 cooperatively provide the poles 34 of the stator (for convenience, the parts of the stator and the elements of the laminae from which they are formed are given the same numbers); the poles are of substantially rectangular configuration in both their axial and also their transverse planes, and thus, they have a single thickness dimension and a single axial length dimension, at all points taken along their radial length. The lamina also cooperatively define longitudinally extending ribs 28, 30, 32 constituting the correspondingly numbered finger elements, which serve as integral radiators for dissipation of the heat that is built up during operation of the motor; the ribs are dimensioned and configured to afford sufficient surface area for efficient heat transfer, while lying substantially entirely within the corner areas defined between the outer circumference of the stator body portion 26 and an imaginary square figure disposed thereabout and having a side dimension equal to the diameter thereof. Four long bolts 37 extend through apertures in the front end cap 14 and are secured within tapped openings in the rear cap 16, to hold the parts in assembly.

Each pole of the stator 12 has a coil 38 mounted thereupon, which is insulated therefrom with paper or a synthetic resinous material, in a conventional manner. The coils 38 are wound and interconnected as schematically shown in FIG. 6. More particularly, a first group, consisting of the poles marked with supplemental numbers 1, 2, 4, 5, 7–12 at their base, are connected as a first phase, designated "A", and poles marked 13–19, 21, 22, 24 are interconnected as a second phase, designated "B"; the remaining four poles (3, 6, 20, 23) are connected as pairs and, depending upon their pairing, are marked either S1 or S2.

It will be noted, furthermore, that most of the poles of each phase group are connected as adjacent couples (e.g., 1 and 2; 13 and 14), the members of the couples being wound in opposite directions so as to cause magnetic flux to flow therethrough when the phase is energized. It will also be noted that one pole of each of the pairs S1 and S2 is disposed directly adjacent a pole of each phase group which is not itself coupled with an adjacent pole of the same phase; i.e., with reference to the S1 pair, pole 3 is adjacent non-coupled A-phase pole 4, and pole 23 is adjacent non-coupled B-phase pole 24. The arrangement illustrated provides a high degree of magnetic balance when the stator is connected to operate on two phases of equal voltage. Terminals 40, 42 and 44, 46 are provided for phases A and B, respectively, and terminals 48, 50 are provided for each of the two circuit legs, which are designated CT1 and CT2; in addition, terminals 52 and 54 are provided for parallel connection of the legs CT1, CT2, and filter capacitors 53 of appropriate value are connected within the circuitry, as shown.

As will be appreciated, the wiring of the stator described adapts the series-connected adjacent elements of the two phase groups A and B to function as torque poles for the motor, and adapts the elements S1 and S2 to function as sensor poles, providing two sensor channels CT1 and CT2, with power input terminals at 52 and 54. The unpaired elements of the two phases adjacent the sensor poles cooperate therewith to provide additional torque for the motor, and to contribute to the magnetic balance upon energization.

Figure 8:
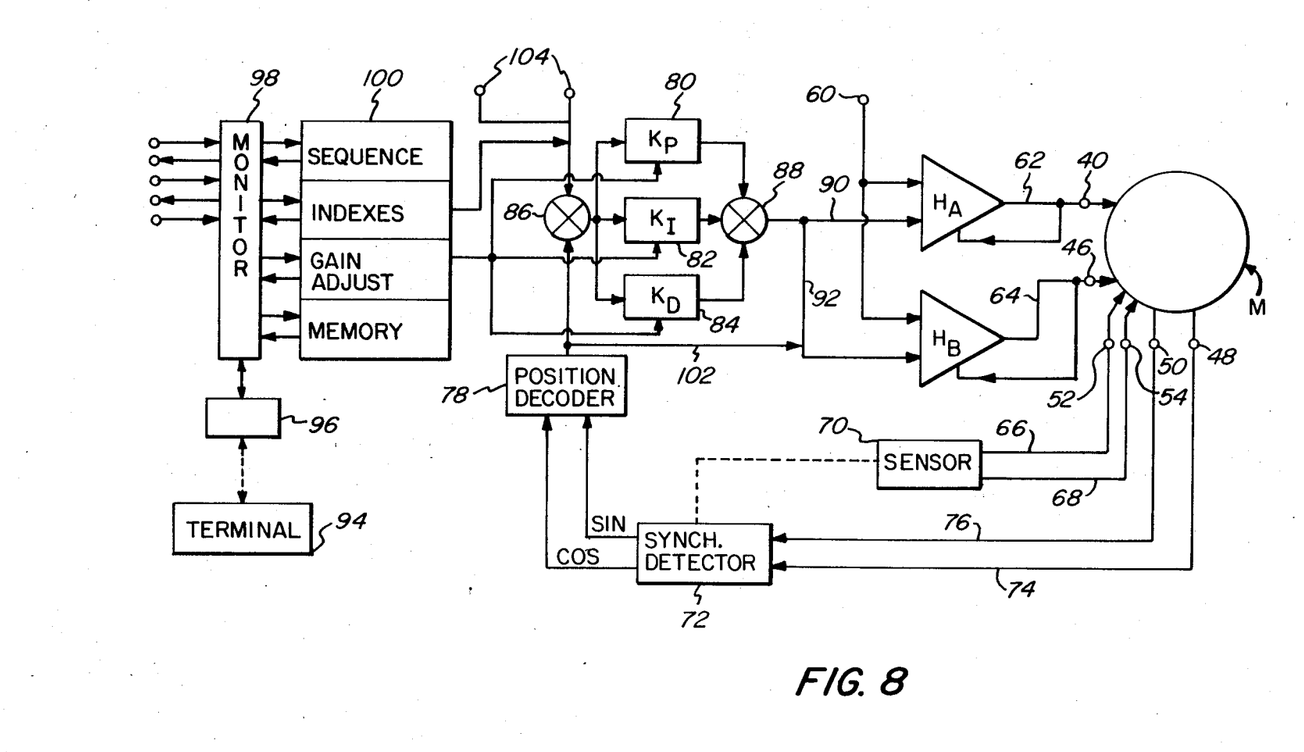
FIG. 8 is a digrammatic representation of a motion control system embodying the invention.

FIG. 8 constitutes a functional block diagram of the system. Power for the motor M is provided by an amplifier, which operates on DC voltage applied to the power terminal 60 and ground connections (not shown), and which comprises an H-bridge for each phase, designated $H_A$ and $H_B$, connected respectively through lines 62, 64, and having current-regulating minor loops, as illustrated; the H-bridges will advantageously employ power field effect transistors, and will typically be operated at 50 kHz chopping frequency.

The terminals 52, 54 for the sensor channels of the motor are connected through lines 66, 68 to a DC powered sensor 70, which may also take the form of an H-bridge and will typically operate at a predetermined constant frequency of 100 kHz to supply an alternating current to the pairs of sensor coils 3, 23 and 6, 20 of the two channels, CT1 and CT2, respectively. The sensor 70 is synchronized with the synchronous detector 72, which is connected through lines 74, 76 to terminals 48 and 50 of the motor M and performs inversion functions upon the signals from the sensor channels, to provide single-level voltages of varying amplitude to a position decoder 78, the latter normally being a function of a microprocessor controller integrated into the system. The microprocessor also performs gain adjustment functions for standard PID controllers 80, 82, 84, and provides an indexing signal which is summed at the junction 86 with the vector signal from the position decoder 78, for input to the controllers. The signal from the output summing junction 88 controls the H-bridge $H_A$ and $H_B$, through lines 90 and 92, for coil energization and pulse-width modulation appropriate to produce desired operation of the motor, depending upon rotor position and the command signals input into the system from the control terminal 94, through the interface port 96 and the microprocessor monitoring, sequencing, indexing, gain adjustment and memory functions 98, 100. Line 102 establishes a commutation loop from the position decoder 78 to the H-bridges, and terminals 104 are provided to accommodate external indexing, if so desired.

As will be appreciated, the amplitude of the voltages detected at terminals 48 and 50 will depend upon the inductance of the coils on the sensor poles, in turn providing an indication of magnetic flux in the pole cores, as affected by the rotor magnets. Because of the geometry of the stator and rotor poles, and the timing of H-bridge switching, the signals from the sensor channels will vary as the rotor turns, and will be 90° electrical out-of-phase to represent sine and cosine functions of the rotor angle; this will enable generation of a vector signal by the position decoder that is indicative of the actual angular position of the rotor. The construction and magnetic configuration of the rotor and stator permit extremely high angular resolution, and hence accuracy of positioning.

As will also be appreciated, the microprocessor of the system will determine, from the information obtained through the integrated feedback system of the motor, precise distances of travel from a home position. By controlling power supplied to the phases through the H-bridge circuits, control of motor speed, as necessary to carry out operational commands, is also afforded.

Although a two-phase system has been illustrated, it will be understood that the concepts of the invention are equally applicable to other polyphase systems; specific modifications will of course have to be made, as will be apparent to those skilled in the art. For example, rather than configuring the rotor and stator to generate signals in the sensor channels that are 90° out-of-phase, for a three-phase system the signals would be 60° electrical out of phase, and three channels (generally compising three pairs of sensor poles) would be provided as a matter of preference, albeit that the provision of only two channels is feasible and would be less expensive. Also, while the total number of stator poles for a two phase motor must be divisable by two, for three-phase operation the number must of course be divisable by three; in both cases however the quotient must, in accordance with the present invention, be an even number.

In addition to the foregoing, it has been found that the numerical relationships that exist between the stator and rotor poles of motors embodying the invention must conform to certain criteria. More particularly, the stator pole:rotor pole ratio in a two-phase motor (in which the sensor poles have non-coupled torque poles associated with them, as illustrated) must be either 4:3 or 4:5, whereas in a three-phase motor of the same design it must be 3:2; Table One below sets forth illustrative combinations of numbers of stator and rotor poles, reflecting these relationships:

TABLE ONE

| Stator Poles | Rotor Poles | |
|---|---|---|
| | Two-Phase | Three-Phase |
| 8 | 6 or 10 | — |
| 12 | — | 8 |
| 16 | 12 or 20 | — |
| 18 | — | 12 |
| 24 | 18 or 30 | 16 |
| 30 | — | 20 |
| 32 | 24 or 40 | — |
| 36 | — | 24 |
| 40 | 30 or 50 | — |
| 42 | — | 28 |

Despite the foregoing, in most instances the minimum total number of stator poles will generally be 24, since that will normally provide optimal magnetic balance and performance in a two-phase motor system.

It is of course also desirable that the motor be of a physically symmetrical nature, again to provide optimal magnetic balance. As can be seen in the illustrated stator, the upper and lower halves bear a mirror-image relationship to one another, in terms of both torque and also sensor poles, across a transverse plane (i.e., taken between poles 15 and 16, and 21 and 72), and the rotor is symmetrical in all diametrical planes. Although the physical distribution of torque and sensor poles shown in the drawings is preferred for a motor of the particular configuration shown, other arrangements are possible. For example, the sensor poles could be grouped together (e.g., as poles 4, 15, 16 and 5) rather than being spaced as shown, with adjacent pairs constituting the two separate sensor channels; however the magnitude and accuracy of the feedback signal would be compromised as a result. It is also not entirely necessary that an unpaired torque pole be associated (i.e., adjacently disposed) with each sensor pole, since they are not involved in the inductance circuits, but their elimination would reduce the torque of the motor.

The structure of the stator illustrated not only provides the desired magnetic characteristics but it also facilitates production and contributes to manufacturing economy. Uniform physical spacing of the poles and the rectangular cross-section of the pole elements (which affords a most desirable distribution of stator metal) are both advantageous from the standpoint of magnetic balance; the ability to employ coil windings that are heaviest at the base of the poles is also a contributing factor. As to economy, the benefits of using a single configuration of stator lamina, and of using pre-wound identical coils, are self-evident.

Especially important advantages of the present motor stem from the fact that it employs coupled torque poles which are located directly adjacent to one another. Flux paths are very short as a result, and there is no crossing of the fluxes of the different phases. These factors in turn minimize magnetic losses and attenuation due to phase interaction, and thereby maximize the efficiency of operation. The use of high energy magnets for the rotor poles, and their close proximity to the stator poles, also aid the development of high torque values and low inductances. As to pole geometry, the confronting faces of the rotor poles will generally be wider than the faces of the stator poles, but narrower than the distance across two adjacent poles including the gap therebetween. In the ideal case, the arrangement of rotor magnets will be such that when one of them is in direct registry with a sensor pole, the other sensor pole of the same channel will be aligned in a gap between the magnets.

Motors embodying the invention are characterized by torque/speed curves that are virtually flat throughout the major portion of their speed range, and this is true under both continuous and also intermittent duty conditions. They are also constructed to provide cycle counts of 8–20 electrical cycles per revolution of the rotor, to afford an optimal balance of accuracy, speed and torque. Cycle counts of six or less provide levels of sensor accuracy that would be inadequate for most applications for which the motors and systems of the invention are intended, and motors with counts of 25 or more will generally be too slow.

An exemplary motor embodying the invention has been produced, and was constructed, wired and controlled as hereinabove described and illustrated. It had a 24-pole steel laminate stator approximately 2¼ inches square in transverse exterior cross-section, and employed an 18 pole, samarium/cobalt alloy permanent magnet rotor of approximately 1 3/16 inch diameter; its axial length (taken as the combined length of the stator and end caps), was two inches.

In operation, the motor exhibited a position resolution of 0.15625 degree; with appropriately modified software for the microprocessor, it is expected that the angular resolution can be made even more precise. The continuous torque, peak torque (system) and peak torque (motor) values (at the specified operating temperature of 85° Centigrade) were (in ounce-inches) 40, 80 and 200, respectively, its no-load speed was 4000 RPM, and its rotor inertia was 0.00176 ounce-inch-second; terminal resistance was 4.0 ohm. Corresponding values for a three-inch long (but otherwise similar) motor would be expected to be 80, 160 and 400 ounce-inches, 3000 RPM, 0.00352 ounce-inch-second, and 3.0 ohm, respectively; for a four-inch model, the values should be 120, 240 and 600, 3000, 0.00528, and 2.0, respectively, in the same units. All such motors would operate at no-load speed with 48 volts applied to the H-bridges, and with an average terminal inductance of 0.5 millihenry, as did the two-inch model tested.

Finally, it will be appreciated that the control functions for the motor will generally be entirely digital and integrated into the systems. In addition to the other self-evident benefits of such construction, the fully integrated construction facilitates self-tuning or "expert" operation, thereby rendering the system of the invention especially well suited for certain applications, such as robotics and the like.

Thus, it can be seen that the present invention provides a novel motion control system, and a novel brushless DC motor for use therein, which are relatively simple and inexpensive to manufacture, which afford a highly desirable balance of accuracy, speed and torque characteristics for precise positioning capability, and which are highly efficient, effective and reliable for their intended purposes. The motor operates in a closed loop feedback mode, employing internal features that are capable of providing signals of large magnitude and high accuracy; it is highly responsive to commands, it enables extraction of exact rotor position information at standstill and has a large number of angular resolution points to provide very precise position information, and it exhibits very smooth running, and full power starting, torque characteristics.

Having thus described the invention, what is claimed is:

1. A polyphase, direct current electric motor, or the like, comprising: a stator of magnetic material comprising a generally cylindrical body portion and a multiplicity of identical pole elements extending radially from said body portion at locations spaced thereabout, and a corresponding multiplicity of coils wound about said pole elements; sensor means having at least two electrical circuit legs, one of said circuit legs being connected to said coils on a first pair of said pole elements and the other of said two circuit legs being connected to said coils on a second pair of said pole elements, said pole elements of said first pair being disposed on said body portion in a non-interposed relationship with said pole elements of said second pair, said sensor means-connected coils adapting the associated pole elements to function in pairs as sensor poles, providing at least two sensor channels for the generation of signals indicative of the angular orientation of a rotor assembled with said stator; and power supply means for providing at least two phases of current, said supply means having one circuit portion connecting said coils wound about a first plurality of said pole elements in series for energization by one phase of current, and having another circuit portion connecting said coils wound about a second plurality of said pole elements in series for energization by a second phase of current, said one and another circuit portions of said supply means, so connected, adapting the associated pole elements to function as first and second phase torque poles, respectively, the total number of said pole elements on said body portion divided by the number of phases provided by said power supply means being an even number, said first and second phase torque poles being interposed with one another and disposed with respect to said sensor poles, about said body portion, so as to provide a magnetically balanced configuration when said torque poles are energized.

2. The motor of claim 1 wherein at least certain of said first phase torque poles are disposed directly adjacent one another, with the coils thereon wound in opposite directions to magnetically couple them when energized, and wherein at least certain of said second phase torque poles are so disposed and coupled, with the coils thereon so wound.

3. The motor of claim 2 wherein said torque pole couples of each phase are separated by at least one torque pole of the other phase.

4. The motor of claim 3 wherein said sensor poles are spaced from one another, and each has a non-coupled one of said first or second phase torque poles disposed directly adjacent to it.

5. The motor of claim 4 wherein said non-coupled pole adjacent one sensor pole of each sensor channel is a first phase pole, and wherein the non-coupled pole adjacent the other sensor pole of the same channel is a second phase pole.

6. The motor of claim 5 wherein said coils on all of said sensor poles are wound in the same direction.

7. The motor of claim 4 wherein said pole elements are equidistantly spaced from one another on said stator body portion.

8. The motor of claim 7 wherein said pole elements are spaced by 15° mechanical, there being 24 of said elements thereon.

9. The motor of claim 8 wherein four of said elements are sensor poles, four of said elements are non-coupled torque poles associated with said sensor poles, and 16 of said elements are coupled torque poles, each of said pluralities consisting of ten pole elements, said power supply means providing two phases of current.

10. The motor of claim 9 wherein each pair of said coupled torque poles of said one phase has a pair of said coupled torque poles of said second phase directly adjacent to it, and wherein said stator is symmetrical, in regard to the arrangement of torque and sensor poles, with respect to a plane extending axially therethrough.

11. The motor of claim 1 wherein said pole elements extend inwardly from said stator body portion to define a space for a rotor therewithin.

12. The motor of claim 1 additionally including a rotor comprising a cylindrical body with an array of pole elements circumferentially disposed thereon.

13. The motor of claim 12 wherein said pole elements extend inwardly from said stator body portion to define a space for said rotor therewithin, said rotor body being a core and having said pole elements disposed on the outer surface thereof.

14. The motor of claim 13 wherein said power supply means provides two phases of current, and wherein said rotor pole elements are permanent magnets the polarities which alternate in said array, the ratio of the number of said stator pole elements to said rotor pole elements being either 4:3 or 4:5.

15. The motor of claim 14 wherein said stator has 24 of said pole elements and said rotor has 18 of said magnet elements thereon.

16. The motor of claim 13 wherein said power supply means provides three phases of current, and wherein said rotor pole elements are either permanent magnets or steel poles, the ratio of the number of said stator pole elements to said rotor pole elements being 3:2.

17. A two phase, direct current electric motor, comprising: a stator of magnetic material comprising of a generally cylindrical body portion and an even-numbered multiplicity of at least 20 identical pole elements extending radially from said body portion at locations spaced thereabout, and a corresponding multiplicity of coils wound about said pole elements; sensor means having two electrical circuit legs, one of said circuit legs being connected to said coils on a first pair of said pole elements spaced from one another on said body portion, and the other of said circuit legs being connected to said coils on a second pair of said pole elements spaced from said first pair of elements and also from one another on said body portion, said sensor means-connected coils adapting the associated pole elements to function in pairs as sensor poles, providing two sensor channels for the generation of signals indicative of the angular orientation of a permanent magnet rotor assembled with said stator; and power supply means for providing two phases of current, said supply means having one circuit portion connecting said coils wound about a first plurality of at least eight of said pole elements in series for energization by one phase of current, and having another circuit portion connecting said coils wound about a second plurality of at least eight of said pole elements for energization by the other phase of current, said one and another circuit portions adapting the associated pole elements to function as first and second phase torque poles, respectively, at least certain of said first phase poles being disposed directly adjacent one another, with the coils thereon wound in opposite directions to magnetically couple them when energized, and at least certain of said second phase poles being so disposed and coupled, with the coils thereon so wound, the resultant torque pole couples of each phase being separated by at least one torque pole of the other phase so as to provide a magnetically balanced configuration when said torque poles are energized.

18. The motor of claim 17 wherein said first and second pluralities each comprise ten of said pole elements, wherein each of said sensor poles has a non-coupled one of said first or second phase poles disposed directly adjacent to it, and wherein said non-coupled pole adjacent one sensor pole of each sensor channel is a first phase pole, and said non-coupled pole adjacent the other sensor pole of the same channel is a second phase pole.

19. The motor of claim 18 wherein said coils on all of said sensor poles are wound in the same direction.

20. The motor of claim 18 wherein said pole elements are equidistantly spaced from one another on said stator body portion.

21. The motor of claim 20 wherein each pair of said coupled torque poles of one phase has a pair of said coupled torque poles of the other phase directly adjacent to it.

22. The motor of claim 17 wherein said pole elements extend inwardly from said stator body portion to define a space for a rotor therewithin.

23. The motor of claim 22 additionally including a rotor comprising a cylindrical body with an array of permanent magnet elements circumferentially disposed thereon, the polarities of said magnet elements alternating in said array, and the ratio of the numbers of stator pole elements to magnet elements being 4:3 or 4:5.

24. The motor of claim 22 wherein said pole elements extend inwardly from said stator body portion to define a space for said rotor therewithin, said rotor body being a core and having said magnet elements disposed on the outer surface thereof.

25. The motor of claim 24 wherein said rotor has 18 of said magnet elements thereon, and wherein said stator has 24 of said pole elements, 4 of said stator pole elements comprising sensor poles, 4 of said stator pole elements comprising non-coupled torque poles, and 16 of said stator pole elements comprising coupled torque poles.

* * * * *